United States Patent
Nagaraj et al.

(10) Patent No.: US 7,311,940 B2
(45) Date of Patent: Dec. 25, 2007

(54) LAYERED PAINT COATING FOR TURBINE BLADE ENVIRONMENTAL PROTECTION

(75) Inventors: Bangalore Aswatha Nagaraj, West Chester, OH (US); Brian Thomas Hazel, West Chester, OH (US)

(73) Assignee: General Electric Company, Schenectady, NY (US)

( * ) Notice: Subject to any disclaimer, the term of this patent is extended or adjusted under 35 U.S.C. 154(b) by 25 days.

(21) Appl. No.: 11/266,857

(22) Filed: Nov. 4, 2005

(65) Prior Publication Data

US 2007/0104969 A1 May 10, 2007

(51) Int. Cl.
*B05D 1/12* (2006.01)
*B05D 1/32* (2006.01)
*B05D 1/38* (2006.01)

(52) U.S. Cl. ............... 427/201; 427/202; 427/203; 427/205; 427/282

(58) Field of Classification Search ............... 427/201, 427/202, 203, 205, 282
See application file for complete search history.

(56) References Cited

U.S. PATENT DOCUMENTS

| | | | |
|---|---|---|---|
| 3,248,249 A | 4/1966 | Collins, Jr. |
| 3,248,250 A | 4/1966 | Collins, Jr. |
| 3,248,251 A | 4/1966 | Allen |
| 4,353,780 A | 10/1982 | Fishter et al. |
| 4,411,730 A | 10/1983 | Fishter et al. |
| 4,537,632 A | 8/1985 | Mosser |
| 4,544,408 A | 10/1985 | Mosser et al. |
| 4,563,239 A | 1/1986 | Adinolfi et al. |
| 4,564,555 A | 1/1986 | Hornberger |
| 4,606,967 A | 8/1986 | Mosser |
| 4,617,056 A | 10/1986 | Mosser et al. |
| 4,659,613 A | 4/1987 | Mosser et al. |
| 4,724,172 A | 2/1988 | Mosser et al. |
| 4,806,161 A | 2/1989 | Fabiny et al. |
| 4,863,516 A | 9/1989 | Mosser et al. |
| 4,889,858 A | 12/1989 | Uno et al. |
| 4,917,960 A | 4/1990 | Hornberger et al. |
| 4,957,567 A | 9/1990 | Krueger et al. |
| 4,975,330 A | 12/1990 | Mosser |
| 5,066,540 A | 11/1991 | Mosser et al. |

(Continued)

FOREIGN PATENT DOCUMENTS

EP    1 111 192 A1    6/2001

(Continued)

*Primary Examiner*—Fred J. Parker
(74) *Attorney, Agent, or Firm*—McNees Wallace & Nurick LLC

(57) ABSTRACT

The present invention is a gas turbine engine turbine blade comprising an airfoil section having at least an exterior surface, a platform section having an exterior surface, an under platform section having an exterior surface, and a dovetail section having an exterior surface. The blade further comprises a corrosion resistant coating on a surface of a turbine blade section selected from the group consisting of the exterior surface of the under platform section, the exterior surface of the dovetail section, and combinations thereof, the corrosion resistant coating comprising a particulate corrosion resistant component comprising from about 5 weight percent to about 100 weight percent corrosion resistant non-alumina particulates having a CTE greater than that of alumina particulates and balance alumina particulates, and a binder component. The present invention also includes methods for making such a gas turbine engine blade.

13 Claims, 6 Drawing Sheets

U.S. PATENT DOCUMENTS

| | | | |
|---|---|---|---|
| 5,260,099 A | 11/1993 | Haskell | |
| 5,368,888 A | 11/1994 | Rigney | |
| 5,472,783 A | 12/1995 | Mosser et al. | |
| 5,514,482 A | 5/1996 | Strangman | |
| 5,723,078 A | 3/1998 | Nagaraj et al. | |
| 5,792,267 A | 8/1998 | Marszal et al. | |
| 5,985,454 A | 11/1999 | McMordie et al. | |
| 6,025,078 A | 2/2000 | Rickerby et al. | |
| 6,074,464 A | 6/2000 | Eddinger et al. | |
| 6,074,602 A | 6/2000 | Wukusick et al. | |
| 6,095,755 A | 8/2000 | Houston | |
| 6,165,600 A * | 12/2000 | Ivkovich et al. | 428/213 |
| 6,224,657 B1 | 5/2001 | Myers et al. | |
| 6,254,341 B1 | 7/2001 | Ackerman et al. | |
| 6,270,318 B1 | 8/2001 | Shah et al. | |
| 6,283,715 B1 | 9/2001 | Nagaraj et al. | |
| 6,368,394 B1 | 4/2002 | Hughes et al. | |
| 6,391,115 B1 | 5/2002 | Marszal et al. | |
| 6,395,406 B1 * | 5/2002 | Sangeeta | 428/650 |
| 6,435,826 B1 | 8/2002 | Allen et al. | |
| 6,521,175 B1 | 2/2003 | Mourer et al. | |
| 6,544,351 B2 | 4/2003 | Wang et al. | |
| 6,613,445 B2 | 9/2003 | Sangeeta et al. | |
| 6,616,978 B1 | 9/2003 | Weimer et al. | |
| 6,676,992 B2 | 1/2004 | Pfaendtner et al. | |
| 6,821,564 B2 * | 11/2004 | Das et al. | 427/248.1 |
| 2004/0013802 A1 | 1/2004 | Ackerman et al. | |
| 2004/0219010 A1 * | 11/2004 | Merrill et al. | 415/173.4 |

FOREIGN PATENT DOCUMENTS

| | | |
|---|---|---|
| GB | 1390526 | 4/1975 |

* cited by examiner

LAYERED PAINT COATING FOR TURBINE BLADE ENVIRONMENTAL PROTECTION

FIELD OF THE INVENTION

The present invention relates generally to a corrosion resistant coating and more particularly to a method of applying a corrosion resistant coating to an under platform surface of a gas turbine engine turbine blade.

BACKGROUND OF THE INVENTION

In an aircraft gas turbine engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against the airfoil section of the turbine blades, which turns the shaft and provides power to the compressor. The hot exhaust gases flow from the back of the engine, driving it and the aircraft forward. The hotter the combustion and exhaust gases, the more efficient is the operation of the jet engine. Thus, there is incentive to raise the combustion gas temperature.

The compressors and turbine of the turbine engine can comprise turbine disks (sometimes termed "turbine rotors") or turbine shafts, as well as a number of blades mounted to the turbine disks/shafts and extending radially outwardly therefrom into the gas flow path, and rotating. Also included in the turbine engine are rotating, as well as static, seal elements that channel the airflow used for cooling certain components such as turbine blades and vanes. The airflow channeled by these rotating, as well as static, seal elements carry corrodant deposits to the non-gas path sides of turbine blades. As the maximum operating temperature of the turbine engine increases, the turbine blades are subjected to higher temperatures. As a result, oxidation and corrosion of the turbine blades have become of greater concern.

Metal salts such as alkaline sulfate, sulfites, chlorides, carbonates, oxides, and other corrodant salt deposits resulting from ingested dirt, fly ash, volcanic ash, concrete dust, sand, sea salt, etc. are a major source of the corrosion, but other elements in the bleed gas environment can also accelerate the corrosion. Alkaline sulfate corrosion in the temperature range and atmospheric region of interest results in pitting of the turbine blade substrate at temperatures typically starting around 1200° F. (649° C.). This pitting corrosion has been shown to occur on turbine blades, primarily the region beneath platforms of turbine blades. The oxidation and corrosion damage can lead to failure or premature removal and replacement of the turbine blades unless the damage is reduced or repaired.

Turbine blades for use at the highest operating temperatures are typically made of nickel-base superalloys selected for good elevated temperature toughness and fatigue resistance. In addition, the turbine blade alloys are coated with environmental coatings to primarily protect the turbine airfoil and platform structures for oxidation and corrosion. These coatings may additionally be deposited on the under platform region of the turbine blade. Typical environmental coatings in wide use include MCrAlX overlay coatings (where M is iron, cobalt and/or nickel, and X is yttrium or another rare earth element), and diffusion coatings that contain aluminum intermetallics, predominantly beta-phase nickel aluminide ($\beta$NiAl) and platinum aluminides (PtAl). These superalloys and the existing environmental coatings used have resistance to oxidation and corrosion damage, but that resistance is not sufficient to protect them at sustained operating temperatures now being reached in gas turbine engines.

Corrosion resistant coating compositions have been suggested for use with various gas turbine components. These include aqueous corrosion resistant coating compositions comprising phosphate/chromate binder systems and aluminum/alumina particles. See, for example, U.S. Pat. No. 4,606,967 (Mosser), issued Aug. 19, 1986 (spheroidal aluminum particles); and U.S. Pat. No. 4,544,408 (Mosser et al), issued Oct. 1, 1985 (dispersible hydrated alumina particles). Corrosion resistant diffusion coatings can also be formed from chromium, or from the respective oxide (i.e., chromia). See, for example, commonly assigned U.S. Pat. No. 6,283,715 (Nagaraj et al), issued Sep. 4, 2001 (chromium diffusion coating). A number of corrosion resistant coatings have also been specifically considered for use on turbine disk/shaft and seal elements. See, for example, U.S. Patent Application 2004/0013802 A1 (Ackerman et al), published Jan. 22, 2004 (metal-organic chemical vapor deposition of aluminum, silicon, tantalum, titanium or chromium oxide on turbine disks and seal elements to provide a protective coating). These prior corrosion resistant coatings have a number of disadvantages when used with turbine blades, including: (1) possibly adversely affecting the fatigue life of the turbine blade elements, especially when these prior coatings diffuse into the underlying metal substrate; (2) potential coefficient of thermal expansion (hereinafter, "CTE") mismatches between the coating and the underlying metal substrate that can make the coating more prone to spalling; and (3) more complicated and expensive processes (e.g., chemical vapor deposition) for applying the corrosion resistant coating to the metal substrate.

What is needed are coatings and coating compositions for turbine blades that: (1) provide corrosion resistance, especially at higher or elevated temperatures; (2) do not affect other mechanical properties of the underlying metal substrate or potentially causing other undesired effects such as spalling; (3) can be formed by relatively uncomplicated and inexpensive methods; (4) can allow for non-destructive evaluation of the underlying substrate during engine overhaul; and (5) can be reapplied or refurbished for continued engine operation. The present invention provides these and other related advantages.

SUMMARY OF THE INVENTION

An embodiment of the present method for coating on under platform section of a gas turbine engine blade, the method comprising the step of providing a gas turbine blade comprising a superalloy selected form the group consisting of nickel-base superalloys, cobalt-base superalloys, iron-base superalloys, and combinations thereof, the blade further comprising an airfoil section having at least an exterior surface, a platform section having an exterior surface, an under platform section having an exterior surface, and a dovetail section having an exterior surface. The method further comprises the step of masking a preselected portion of the gas turbine blade leaving the exterior surface of a non-masked section selected from the group consisting of the under platform section, the dovetail section, and combinations thereof, unmasked. The method further comprises applying a layer of corrosion resistant coating composition, the composition comprising a glass-forming binder and corrosion resistant particulates to the exterior surface of the non-masked section, the particulates comprising from about 5 weight percent to about 100 weight percent non-alumina corrosion resistant particulates having a CTE greater than that of the alumina particulates and balance alumina particulates. The method further comprises curing the layer of corrosion resistant coating composition to form a corrosion resistant coating layer. The method further comprises removing the maskant.

Another embodiment of the present invention is a gas turbine engine turbine blade comprising an airfoil section having at least an exterior surface, a platform section having an exterior surface, an under platform section having an exterior surface, and a dovetail section having an exterior surface. The blade further comprises a corrosion resistant coating on a surface of a turbine blade section selected from the group consisting of the exterior surface of the under platform section, the exterior surface of the dovetail section, and combinations thereof, the corrosion resistant coating comprising a particulate corrosion resistant component comprising from about 5 weight percent to about 100 weight percent corrosion resistant non-alumina particulates having a CTE greater than that of alumina particulates and balance alumina particulates, and a binder component.

Yet another embodiment of the present invention is a gas turbine engine turbine blade comprising an airfoil section having at least an exterior surface, a platform section having an exterior surface, an under platform section having an exterior surface, and a dovetail section having an exterior surface. The blade further comprises a corrosion resistant coating on a surface of a turbine blade section selected from the group consisting of the exterior surface of the under platform section, the exterior surface of the dovetail section, and combinations thereof. The corrosion resistant coating comprises a plurality of layers, with at least one lower layer adjacent to the exterior surface and at least one upper layer adjacent the at least one lower layer. The at least one lower layer comprises a particulate corrosion resistant component comprising from about 5 weight percent to about 100 weight percent corrosion resistant non-alumina particulates having a CTE greater than that of alumina particulates and balance alumina particulates and a binder component. The at least one upper layer comprises a particulate corrosion component comprising a higher weight percent of alumina particulates than the lower layer and a binder component.

An advantage of the present invention is that the corrosion resistant coating of the present invention will provide corrosion resistance at elevated temperatures.

Another advantage of the present invention is that the coating of the present invention does not affect other mechanical properties of the underlying metal substrate.

Another advantage of the present invention is that that corrosion resistant coating of the present invention does not cause other undesired effects such as spalling.

Yet another advantage of the present invention is that the corrosion resistant coating of the present invention may be applied to a gas turbine blade by relatively uncomplicated and inexpensive methods.

Yet another advantage of the present invention is that the corrosion resistant coating of the present invention allows non-destructive testing of the underlying substrate during engine overhaul.

Yet another advantage of the present invention is that the corrosion resistant coating of the present invention can be reapplied or refurbished for continued engine operation.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
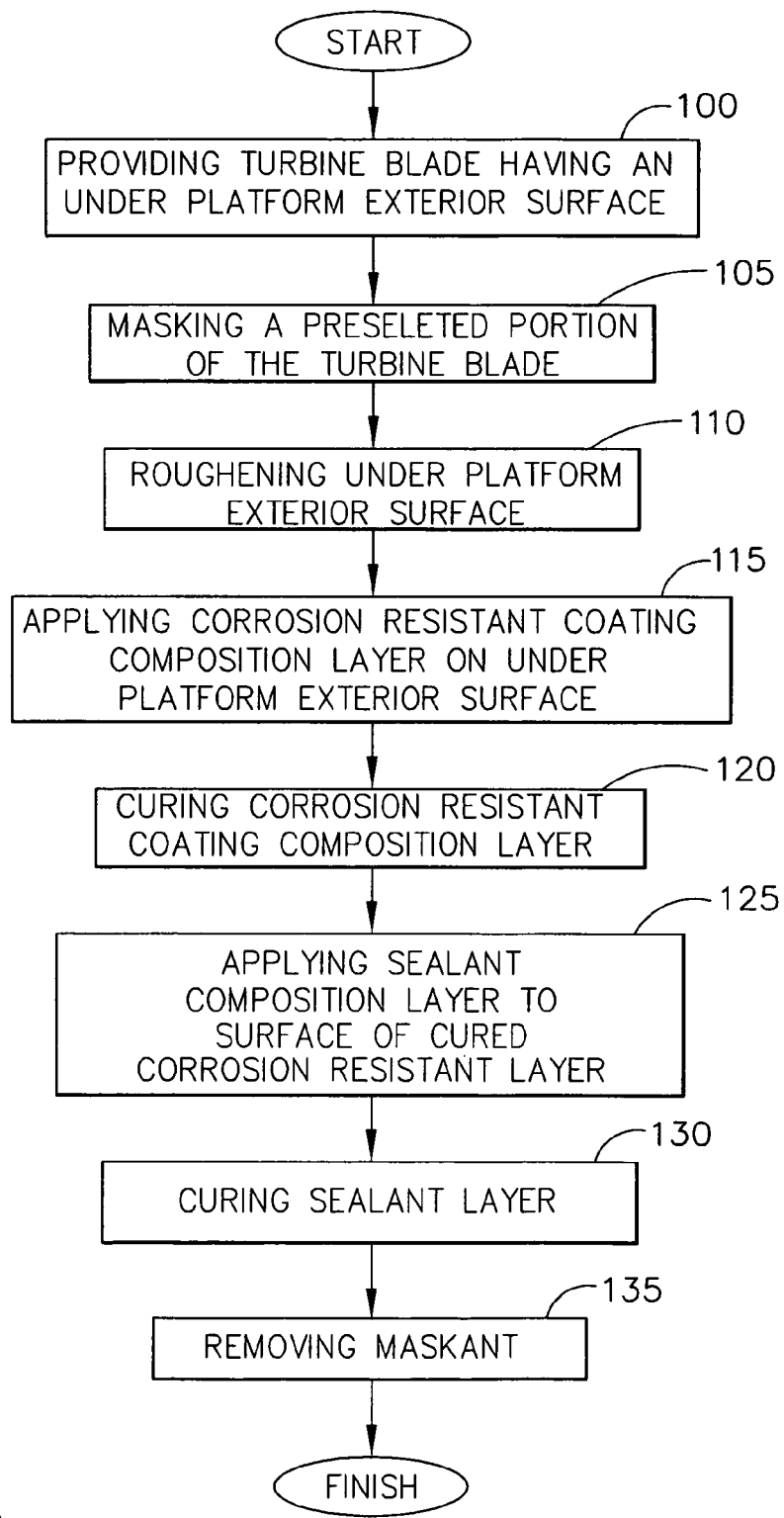
FIG. 1 is a process flow chart illustrating the application of the corrosion resistant coating of the present invention as a single-layer corrosion resistant coating.

As used herein, the term "particulate" refers to a particle, powder, flake, etc., that inherently exists in a relatively small form (e.g., a size of about 50 microns or less) or can be formed by, for example, grinding, shredding, fragmenting, pulverizing or otherwise subdividing a larger form of the material into a relatively small form.

As used herein, the term "unimodal particle size distribution" refers to a particle size distribution comprising one particle size fraction. When graphically plotted, a unimodal particle size distribution has essentially a single peak.

As used herein, the term "bimodal particle size distribution" refers to a particle size distribution that comprises a smaller particle size fraction and a larger particle size fraction. When graphically plotted, a bimodal particle size distribution has essentially two distinct peaks.

As used herein, the term "polymodal particle size distribution" refers to a particle size distribution that comprises three or more particle size fractions. When graphically plotted, a polymodal particle size distribution has three or more distinct peaks.

As used herein, the term "alumina particlates" refers to particulates comprising compounds, compositions, etc., of aluminum oxide typically having the formula $Al_2O_3$, including unhydrated and hydrated forms.

As used herein, the term "corrosion resistant non-alumina particulates" refers to particulates that provide corrosion resistance and comprise a metal (other than solely aluminum), a ceramic or combination thereof that is substantially free of alumina.

As used herein, the term "substantially free" means the indicated compound, material, component, etc., is minimally present or not present at all, e.g., at a level of about 0.5% or less, more typically at a level of about 0.1% or less, unless otherwise specified.

As used herein, the term "corrosion resistant particulate component" refers to a component comprising corrosion resistant non-alumina particulates, with or without alumina particulates. The particular level and amount of corrosion resistant non-alumina particulates and alumina particulates present in the corrosion resistant particulate component can be varied depending on the CTE properties desired for the resultant corrosion resistant coating, whether the corrosion resistant coating comprises a single layer or a plurality of layers, the thickness of the coating, the particle size distribution of the corrosion resistant non-alumina particulates and the alumina particulates, etc. The non-alumina particulates have a CTE greater than that of alumina particles. The corrosion resistant particulate component comprises from about 5 to 100% corrosion resistant non-alumina particulates with balance alumina particulates, preferably from about 25 to 100% corrosion resistant non-alumina particulates with balance alumina particulates and, more preferably from about 50 to 100% corrosion resistant non-alumina particulates balance alumina particulates and can consist essentially of corrosion resistant non-alumina particulates, e.g., about 100% corrosion resistant non-alumina particulates. The particulates comprising the corrosion resistant particulate component can have particle sizes in the range of from about 0.01 to about 50 microns, more typically in the range of from about 0.1 to about 25 microns and can comprise particulates having unimodal, bimodal or polymodal particle size distributions. When the corrosion resistant particulate component comprises corrosion resistant non-alumina particulates and alumina particulates, a bimodal particle size distribution can be desirable to provide a greater solids packing density for the particulate component. For bimodal particle size distributions, the larger particle size fraction can comprise the non-alumina particulates, while the smaller particulate size fraction can comprise the alumina particulates, and vice versa.

As used herein, the term "metal" can refer to a single metal or a metal alloy, i.e., a blend of at least two metals (e.g., aluminum alloys). Metals can include chromium, zirconium, nickel, cobalt, iron, titanium, yttrium, magnesium, platinum group metals (e.g., platinum, palladium, rhodium, iridium, etc.), hafnium, silicon, tantalum, etc., alloys of any of these metals, and alloys of any of these metals with aluminum, e.g., overlay metal alloys.

As used herein, the term "rare earth element" can refer to a single rare earth element or a combination of rare earth elements. Rare earth elements can include lanthanum, cerium, praseodymium, neodymium, samarium, europium, gadolinium, terbium, dysprosium, holmium, erbium, thulium, ytterbium, lutetium and combinations thereof.

As used herein, the term "rare earth oxide" refers to an oxide(s) of a rare earth element.

As used herein, the term "ceramic" refers to an oxide, carbide, nitride, etc., of a metal. Ceramics suitable for use herein include oxides, carbides, nitrides, etc., of any of the metals (other than solely aluminum) referred to herein, combinations of such oxides, carbides, nitrides, etc., including, but not limited to zirconia and phase-stabilized zirconias (i.e., various metal oxides, for example, yttrium oxides blended with zirconia), such as yttria-stabilized zirconias, calcia-stabilized zirconias, scandia-stabilized zirconias, magnesia-stabilized zirconias, zirconias stabilized by any rare earth oxide, for example rare earth oxide stabilized zirconia as described in U.S. Pat. No. 6,025,078 (Rickerby et al.), issued Feb. 15, 2000, which is hereby incorporated by reference in its entirety, etc., as well as mixtures of such stabilized zirconias. Suitable yttria-stabilized zirconias can comprise from about 1 to about 65% yttria (based on the combined weight of yttria and zirconia), and more preferably from about 3 to about 10% yttria. Other suitable ceramics for use herein include titania, ceria, $Y_3Al_5O_{12}$, hafnia, and hafnia stabilized by any rare earth oxide, lanthanum hexaluminate, and other metal aluminates, chromium carbide ($Cr_2C_3$), etc.

As used herein, the term "overlay metal alloy" refers to metal alloys having the formula MCr, MAl, MCrAl, MCrAlX, MCrX, or MAlX, wherein M is nickel, cobalt, iron, etc., or an alloy thereof and wherein X is hafnium, zirconium, yttrium, tantalum, platinum, palladium, rhenium, silicon, etc., or a combination thereof. Typically, the overlay metal alloys used herein are MCrAlX alloys, and more typically wherein M is nickel or a nickel-cobalt alloy and wherein X is yttrium (i.e., Y).

As used herein, the term "corrosion resistant coating" refers to coatings that, after curing of the deposited corrosion resistant coating of this invention, comprise at least one layer adjacent to the metal substrate having an amorphous, glassy matrix and having embedded therein, encapsulated therein, enclosed thereby, or otherwise adhered thereto, particulates from the corrosion resistant particulate component. Corrosion resistant coatings of this invention can provide resistance against corrosion caused by various corrodants, including metal (e.g., alkaline) sulfates, sulfites, chlorides, carbonates, oxides, and other corrodant salt deposits resulting from ingested dirt, fly ash, volcanic ash, concrete dust, sand, sea salt, etc., at temperatures typically of at least about 1000° F. (538° C.), more typically at least about 1200° F. (649° C.). The corrosion resistant coatings of this invention can be homogeneous or substantially homogeneous throughout in the terms of the composition of the particulate and binder components, or can comprise a discrete layer(s) adjacent to the metal substrate that comprises a homogenous or substantially homogeneous composition of the particulate and binder components. For example, the corrosion resistant coatings of this invention can be a single layer comprising non-alumina particulates throughout that have a CTE greater than that of alumina, or can be a plurality of layers of differing composition, e.g., an inner layer adjacent to the metal substrate that comprises non-alumina particulates having a CTE greater than that of alumina, an intermediate layer that comprises a higher level of alumina particulates, e.g., a level of alumina particulates such that the CTE is not measurably different from that of alumina, and an outer layer that consists essentially of a composition that is similar to a glass-forming binder component but without particulates, e.g., a sealant composition that forms a glassy top coat.

As used herein, the term "glass-forming binder component" refers to a component comprising a typically inorganic compound, composition, etc., that, when cured, forms an amorphous, glassy matrix to which the particulates in the particulate component are embedded in, are encapsulated in, are enclosed by, or otherwise adhered to. Binder components suitable for use herein typically comprise a phosphate binder, with or without other binder materials. These phosphate binders can be in the form of phosphoric acid or more typically the respective phosphate compounds/compositions, including orthophosphates, pyrophosphates, etc. These phosphate compounds/compositions can be monobasic, dibasic, tribasic or any combination thereof. Phosphate-containing binder components can comprise one or more metal phosphates, including aluminum phosphates, magnesium phosphates, chromium phosphates, zinc phosphates, iron phosphates, lithium phosphates, calcium phosphates, etc., or any combination thereof. Typically, the phosphate-containing binder component comprises an aluminum phosphate, a magnesium phosphate, a chromium phosphate, or a combination thereof. The phosphate-containing binder component can optionally comprise other binder material, including one or more chromates, molybdates, etc. See, for example, U.S. Pat. No. 3,248,249 (Collins, Jr.), issued Apr. 26, 1966; U.S. Pat. No. 3,248,251 (Allen), issued Apr. 26, 1966; U.S. Pat. No. 4,889,858 (Mosser), issued Dec. 26, 1989; U.S. Pat. No. 4,975,330 (Mosser), issued Dec. 4, 1990, all of which are incorporated herein by reference in their entireties. The phosphate-containing binder component can also be substantially free of other binder materials, e.g., a substantially chromate free phosphate-containing binder component. See, for example, U.S. Pat. No. 6,368,394 (Hughes et al), issued Apr. 9, 2002 (substantially chromate free phosphate binder component), which is incorporated herein by reference in its entirety.

As used herein, the term "liquid carrier component" refers to any carrier component that is liquid at ambient temperatures and in which the corrosion resistant particulate component and glass-forming binder component is typically carried in, dispersed in, dissolved in, etc. Liquid carrier components include aqueous systems (e.g., comprising water), organic systems (e.g., comprising alcohols such as ethanol, propanol, isopropanol, etc., other liquid organic materials or solvents such as ethylene glycol, acetone, etc.) or any combination thereof. These liquid carrier components can comprise other optional materials such as surfactants, buffers, etc. Aqueous carrier components can consist essentially of water, i.e., is substantially free of other optional materials, but more typically comprises other optional materials such as compatible organic solvents, surfactants, etc. Suitable surfactants for use in aqueous carrier components can include nonionic surfactants, anionic surfactants, cationic surfactants, amphoteric surfactants, zwitterionic surfactants, or any combination thereof. Illustrative examples of surfactants suitable for use herein include ethoxylated alkyl phenols or aliphatic alcohols, nonionic tertiary glycols, cationic secondary and tertiary amines of the polyoxy cocamine type, quaternary amines, as well as sodium heptadecyl sulfate, sodium tetradecyl sulfate and sodium 2-ethylhexyl sulfate. The inclusion of surfactants can be for the purpose of improving the wettability of the particulate component, reducing the surface tension of the corrosion resistant coating composition, promoting the formation of improved smoothness in the resultant corrosion resistant coating, etc.

As used herein, the term "corrosion resistant coating composition" refers to any coating composition of this invention comprising the corrosion resistant particulate component, the glass-forming binder component, optionally a liquid carrier component, etc., and which is used to form at least one layer of the corrosion resistant coating of this invention that is adjacent to the metal substrate. For corrosion resistant coating compositions of this invention, the ratio of the corrosion resistant particulate component to glass-forming binder component is typically in the range from about 0.1 to about 10, more typically in the range of from about 0.5 to about 5. The optional liquid carrier component, when included, typically comprises the balance of the corrosion resistant coating composition of this invention. The corrosion resistant coating compositions of this invention can be formulated as flowable solids (e.g., flowable powders), can be formulated as cast tapes comprising a blend, mixture or other combination of the particulate and binder components, with or without a supporting structure such as a film, strip, etc., or can be formulated as liquids. The corrosion resistant coating compositions of this invention can comprise other optional components such as colorants or pigments, viscosity modifying or controlling agents, etc.

Typically, the corrosion resistant coating compositions of this invention are formulated as liquid compositions. The liquid corrosion resistant coating compositions of this invention can be of any desired consistency, flowability, viscosity, etc., including thixotropic or non-thixotropic compositions. The aqueous corrosion resistant coating compositions of this invention usually have an acidic pH (i.e., below about 7). For example, for aqueous corrosion resistant coating compositions comprising a phosphate-containing binder component, the pH is typically in the range of from about 0 to about 3, and more typically in the range of from about 1.5 to about 3.

As used herein, the term "curing" refers to any treatment condition or combination of treatment conditions that causes the corrosion resistant coating composition to thereby form the corrosion resistant coating. Typically, curing occurs by heating the corrosion resistant coating composition at a temperature of at least about 250° F. (121° C.), more typically at a temperature of at least about 500° F. (260° C.).

As used herein, the term "CTE" refers to the coefficient of thermal expansion of a material, and is referred to herein in units of $10^{-6}/°$ F. For example, alumina which has a coefficient of thermal expansion of about 4 to $5\times10^{-6}/°$ F. at about 1200° F. (649° C.) is referred to herein as having a CTE of about 4 to 5.

As used herein, the term "CTE greater the alumina" refers to a CTE of the non-alumina particulate that is measurably greater than that of the CTE of the alumina particulate at the same or similar reference temperature. Typically the CTE of the non-alumina particulate is at least about 0.2 greater, more typically, at least about 0.5 greater than that of the CTE of the alumina particulate.

As used herein, the term "comprising" means various particulates, materials, coatings, compositions, components, layers, steps, etc., can be conjointly employed in the present invention. Accordingly, the term "comprising" encompasses the more restrictive terms "consisting essentially of" and "consisting of."

All amounts, parts, ratios and percentages used herein are by weight unless otherwise specified.

Figure 3:
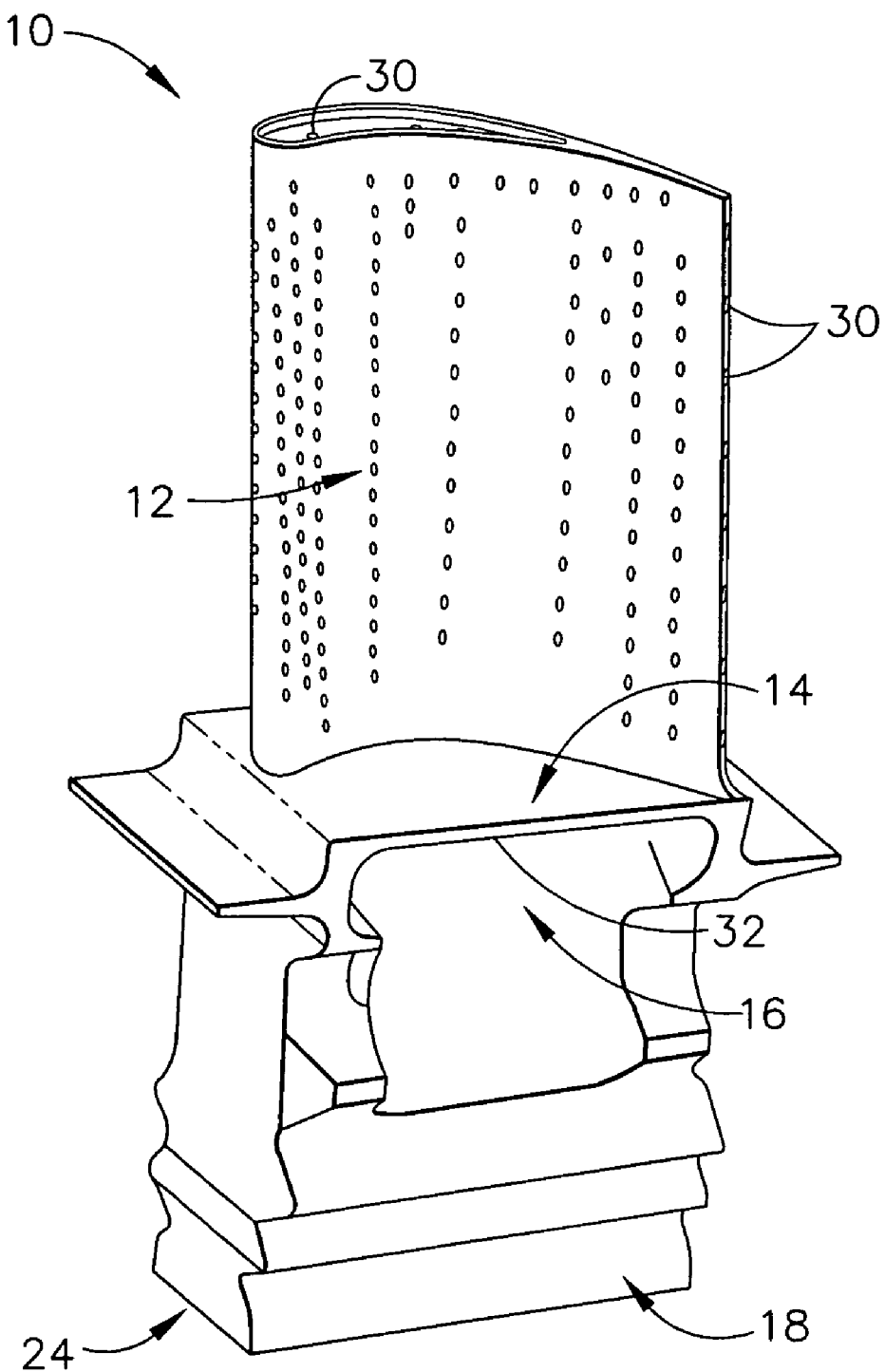
FIG. 3 is a perspective view of an embodiment of a turbine blade coated with the corrosion resistant coating of the present invention.
Figure 4:
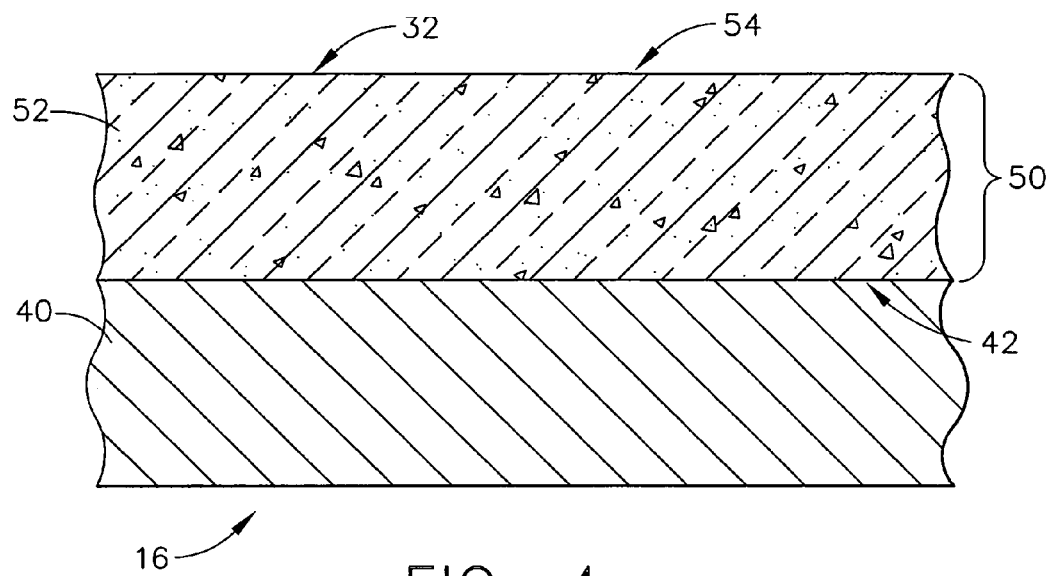
FIG. 4 is a schematic view of a single-layer corrosion resistant coating of the present invention deposited on the under platform substrate of the turbine blade.
Figure 5:
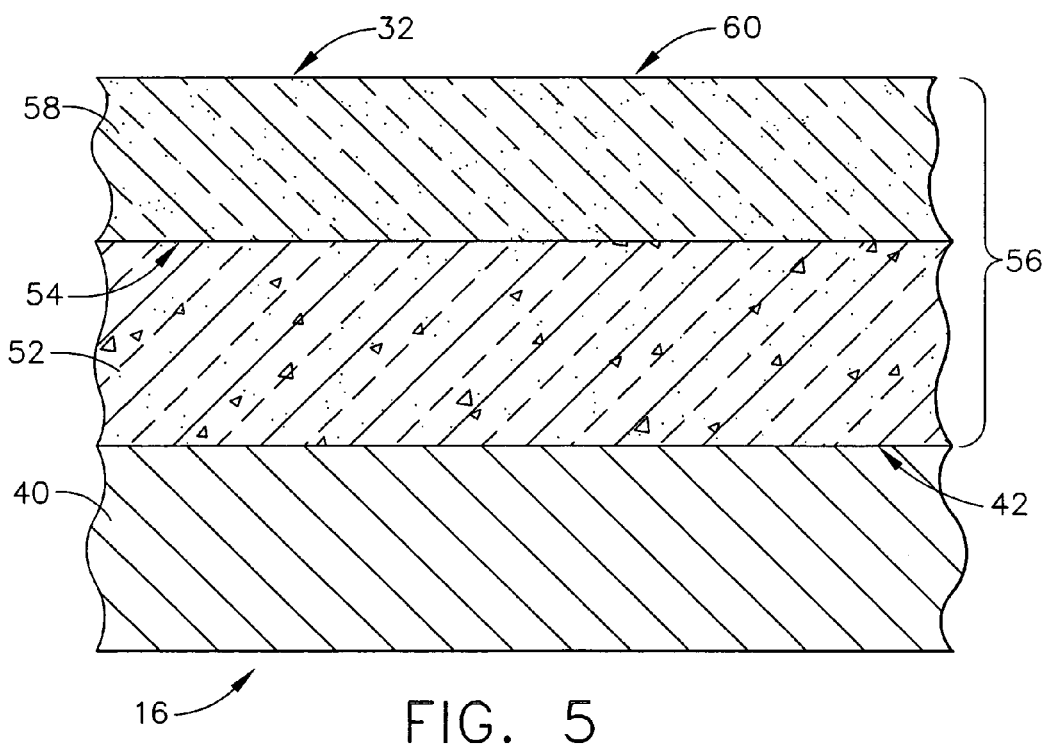
FIG. 5 is a schematic view similar to FIG. 4 of a single-layer corrosion resistant coating of the present invention with an additional outer layer.

Referring now to FIG. 1 there is shown the method of the present invention for applying a corrosion resistant coating to the surface of an under platform section of a gas turbine engine turbine blade. As shown in FIG. 1, in one embodiment of the method of the present invention, the initial step 100 is the provision of a gas turbine engine blade having an under platform exterior surface. As shown in FIG. 3, an exemplary gas turbine engine blade 10 has several sections, including a airfoil section 12, a platform section 14, an under platform section 16, and a dovetail section 18. Initially, the under platform metal substrate 40, shown in FIGS. 4-5, is uncoated.

The metal substrate 40 of the gas turbine engine blade 10 can comprise any of a variety of metals, or more typically metal alloys, including those based on nickel, cobalt and/or iron alloys. Substrate 40 typically comprises a superalloy based on nickel, cobalt and/or iron. Such superalloys are disclosed in various references, such as, for example, commonly assigned U.S. Pat. No. 6,074,602 (Wuskusick et al.), issued Jun. 13, 2000, which is incorporated by reference herein in its entirety. The substrate 40 may also be an aluminide bond coat as known in the art.

Turbine blade substrate 40 more typically comprises a nickel-based alloy, and particularly a nickel-based superalloy, that has more nickel than any other element. The nickel-based superalloy can be strengthened by the precipitation of gamma prime or a related phase. A nickel-based superalloy for which the corrosion resistant coating of this invention is particularly useful is available by the trade name RenéN5, having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and incidental impurities.

The next step 105 is the masking of a preselected portion of the turbine blade 10, wherein the portion masked is the portions of the blade 10 that would not benefit from the roughening and application of the corrosion resistant coating. The next step 110 is roughening the under platform exterior surface 42 to make the surface 42 more receptive to the application of the coating of the present invention. Such roughening includes chemical and/or mechanic pretreatment. Suitable pretreatment methods include grit blasting, with or without masking of surfaces that are not to be subjected to grit blasting (see U.S. Pat. No. 5,723,078 to Nagaraj et al., issued Mar. 3, 1998, especially col. 4, lines 46-66, which is incorporated by reference in its entirety), micromachining, laser etching (see U.S. Pat. No. 5,723,078 to Nagaraj et al., issued Mar. 3, 1998, especially col. 4, line 67 to col. 5, line 3 and 14-17, which is incorporated by reference in its entirety), treatment with chemical etchants such as those containing hydrochloric acid, hydrofluoric acid, nitric acid, ammonium bifluorides and mixtures thereof, (see, for example, U.S. Pat. No. 5,723,078 to Nagaraj et al., issued Mar. 3, 1998, especially col. 5, lines 3-10; U.S. Pat. No. 4,563,239 to Adinolfi et al., issued Jan. 7, 1986, especially col. 2, line 67 to col. 3, line 7; U.S. Pat. No. 4,353,780 to Fishter et al., issued Oct. 12, 1982, especially col. 1, lines 50-58; and U.S. Pat. No. 4,411,730 to Fishter et al., issued Oct. 25, 1983, especially col. 2, lines 40-51, all of which are hereby incorporated by reference in their entireties), treatment with water under pressure (i.e., water jet treatment), with or without loading with abrasive particles, as well as various combinations of these methods. Typically, the surface 42 of metal substrate 40 is pretreated by grit blasting where surface 42 is subjected to the abrasive action of silicon carbide particles, steel particles, alumina particles or other types of abrasive particles. These particles used in grit blasting are typically alumina particles and typically have a particle size of from about 600 to about 35 mesh (from about 25 to about 500 micrometers), more typically from about 360 to about 35 mesh (from about 35 to about 500 micrometers).

The next step 115 is depositing a layer of corrosion resistant coating composition on the surface 42 of the metal substrate 40. The corrosion resistant coating composition is disclosed in U.S. patent application Ser. No. 11/011,695, filed Dec. 15, 2004, entitled "CORROSION RESISTANT COATING COMPOSITION, COATED TURBINE COMPONENT AND METHOD FOR COATING SAME", which is incorporated by reference herein in its entirety. The corrosion resistant coating composition can be deposited in solid form, e.g., as a flowable solid, as a cast tape (e.g., a cast tape formed as a layer or plurality layers of particulates adhered together as a coherent mass or matrix by the binder, with or without a supporting structure such as a film, strip, etc.), etc., to provide a solid uncured layer of the composition comprising the corrosion resistant particulates and binder component. More typically, the coating composition is deposited as a liquid, e.g., an aqueous coating composition. Liquid corrosion resistant coating compositions of this invention can be deposited on substrate 40 by any manner of application for depositing liquids including pouring, flowing, dipping, spraying, rolling, etc., to provide an uncured layer of the composition comprising the particulates and binder component. In a preferred embodiment, the non-alumina corrosion resistant particulates are selected from the group consisting of an overlay metal alloy, zirconia, yttria-stabilized zirconia, zirconia stabilized with a rare earth oxide and combinations thereof. In a more preferred embodiment, the non-alumina corrosion resistant particulates are selected from the group consisting of NiCrAlY, CoCrAlY, zirconia, yttria-stabilized zirconia, and combinations thereof.

The next step 120 is curing the deposited coating composition at a temperature that causes the corrosion resistant particulate component (i.e., non-alumina particulates, plus any alumina particulates) and glass-forming binder component to form the layer of the corrosion resistant coating 52 adjacent to metal substrate 40 that comprises an amorphous, glassy matrix of binder to which the particulates in the particulate component are embedded in, encapsulated in, enclosed by, or otherwise adhered to. This curing is typically accomplished by heating to a temperature of at least about 250° F. (121° C.), more typically at least about 500° F. (260° C.) to form corrosion resistant coating 52. If any liquid carrier component is present in the deposited coating composition, the liquid carrier component is evaporated and/or vaporized during the step of curing 120. As shown in FIG. 4, when no sealant layer is added to the surface 54, then the surface 54 of coating 52 is the surface 32 of under platform corrosion resistant coating, shown generally as 50. In such as case, coating 52 can be formed up to a thickness of about 10 mils (254 microns), and typically has a thickness in the range of from about 0.1 to about 5 mils (from about 3 to about 127 microns), more typically from about 0.2 to about 4 mils (from about 5 to about 102 microns).

The next optional step 125 is applying a sealant composition layer to the surface of the cured corrosion resistant coating layer 54. This outer sealant composition layer can comprise a particulate component, but is typically substantially free of particulates. Typically, the upper sealant composition layer is formed from a sealant composition or a composition that consists essentially of, or entirely of, a glass-forming binder component (i.e., is substantially free of particulates). Such outer glassy sealant layers can be formed from commercially available sealant products, for example, Alseal 598 (from Coatings for Industry, Inc. of Souderton, Pa.), SermaSeal TCS (from Sermatech International of Pottstown, Pa.), etc.

The next optional step 130 is curing the sealant composition layer to form a glassy outer sealant layer 56. This curing is typically accomplished by heating the sealant composition layer to a temperature of at least about 250° F. (121° C.), more typically at least about 500° F. (260° C.) to form the upper sealant layer 56 of corrosion resistant coating. If any liquid carrier component is present in the sealant composition later, the liquid carrier component is evaporated and/or vaporized during the step of curing 120. An embodiment of a corrosion resistant coating of this invention comprising a single corrosion resistant coating layer 54 and an upper sealant layer 58 is shown generally as 56 in FIG. 5. Outer layer 58 is also typically thinner than the underlying layer 52, especially when substantially free of particulates. As shown in FIG. 5, when a sealant layer 58 is added to the surface 54, then the surface 60 of the glassy outer sealant layer 58 is the surface 32 of under platform corrosion resistant coating 56. In such a case, coating 58 can be formed up to a thickness of about 10 mils (254 microns), and typically has a thickness in the range of from about 0.1 to about 5 mils (from about 3 to about 127 microns), more typically from about 0.2 to about 4 mils (from about 5 to about 102 microns). Typically, outer layer 58 has a thickness of from about 0.01 to about 2 mils (from about 0.3 to about 51 microns), more typically from about 0.1 to about 1 mils (from about 3 to about 25 microns). The final step 135 is removing the maskant as known in the art.

Figure 2:
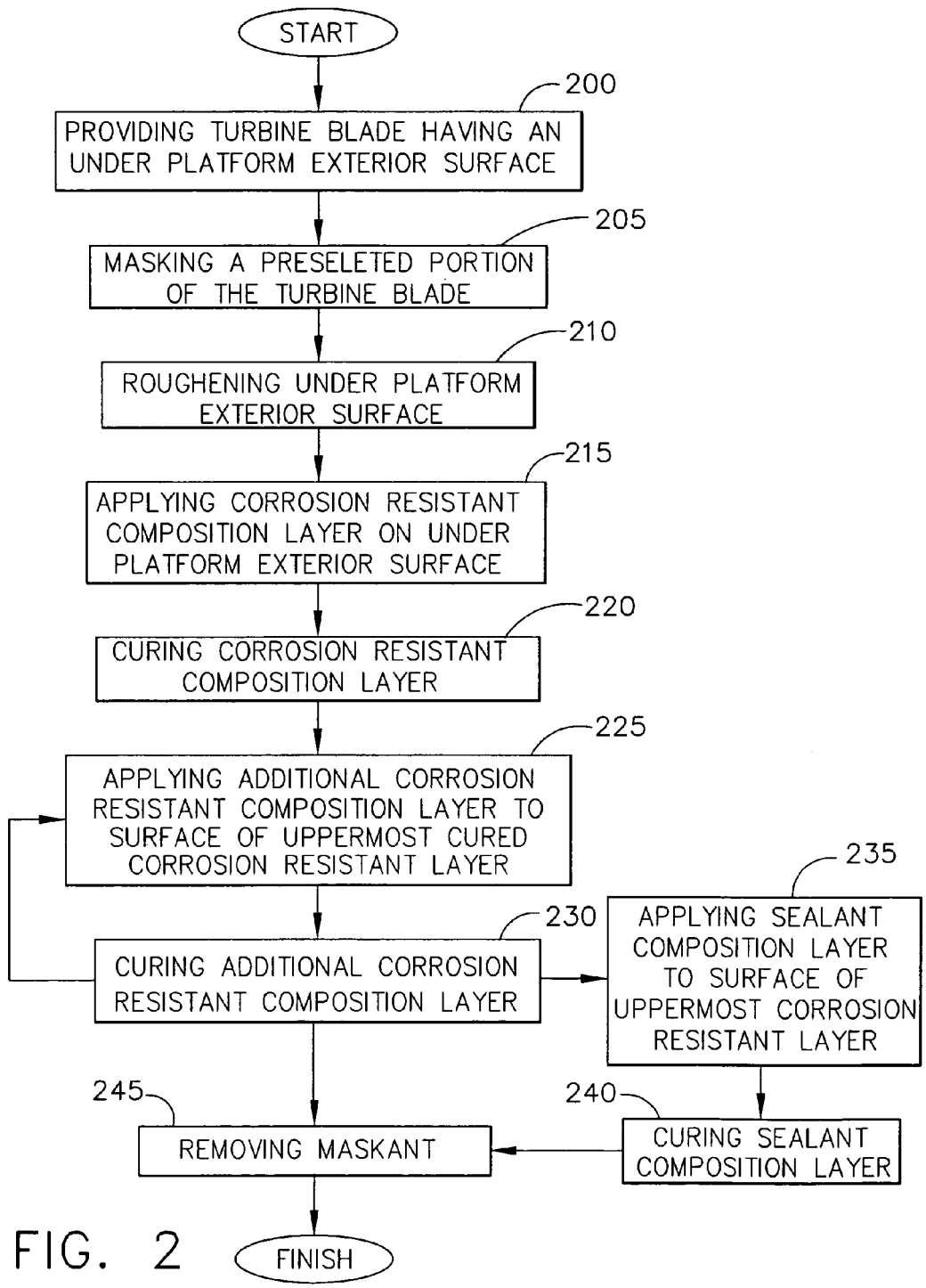
FIG. 2 is a process flow chart illustrating the application of the corrosion coating of the present invention as a multiple-layer corrosion resistant coating.

In another embodiment of the present invention as shown in FIG. 2, the first step 200 is the provision of a gas turbine engine blade 10 having an under platform exterior surface. As described further above, the metal substrate 40 of the gas turbine engine blade 10 can comprise any of a variety of metals, or more typically metal alloys, including those based on nickel, cobalt and/or iron alloys. The substrate 40 may also be an aluminide bond coat as known in the art.

The next step 205 is the masking of a preselected portion of the turbine blade 10, wherein the portion masked is the portion of the blade 10 that would not benefit from the roughening and application of the corrosion resistant coating. The next step 210 is roughening the under platform surface 42 to make the surface 42 more receptive to the application of the coating of the present invention. As described above, such roughening includes chemical and/or mechanic pretreatment. Typically, the surface 42 of metal substrate 40 is pretreated by grit blasting where surface 42 is subjected to the abrasive action of silicon carbide particles, steel particles, alumina particles or other types of abrasive particles. These particles used in grit blasting are typically alumina particles and typically have a particle size of from about 600 to about 35 mesh (from about 25 to about 500 micrometers), more typically from about 360 to about 35 mesh (from about 35 to about 500 micrometers).

The next step 215 is depositing a first layer of corrosion resistant coating composition on the surface 42 of the metal substrate 40. As set forth above, the corrosion resistant coating composition is disclosed in U.S. patent application Ser. No. 11/011,695, filed Dec. 15, 2004, entitled "CORROSION RESISTANT COATING COMPOSITION, COATED TURBINE COMPONENT AND METHOD FOR COATING SAME", which is incorporated by reference herein in its entirety. The corrosion resistant coating composition can be deposited in solid form, e.g., as a flowable solid, as a cast tape (e.g., a cast tape formed as a layer or plurality layers of particulates adhered together as a coherent mass or matrix by the binder, with or without a supporting structure such as a film, strip, etc.), etc., to provide a solid uncured layer of the composition comprising the corrosion resistant particulates and binder component. More typically, the coating composition is deposited as a liquid, e.g., an aqueous coating composition. Liquid corrosion resistant coating compositions of this invention can be deposited on substrate 40 by any manner of application for depositing liquids including pouring, flowing, dipping, spraying, rolling, etc., to provide an uncured layer of the composition comprising the particulates and binder component. In a preferred embodiment, the non-alumina corrosion resistant particulates are selected from the group consisting of an overlay metal alloy, zirconia, yttria-stabilized zirconia, and combinations thereof. In a more preferred embodiment, the non-alumina corrosion resistant particulates are selected from the group consisting of NiCaAlY, CoCrAlY, zirconia, yttria-stabilized zirconia, and combinations thereof.

The next step 220 is curing the first deposited coating at a temperature that causes the corrosion resistant particulate component (i.e., non-alumina particulates, plus any alumina particulates) and glass-forming binder component to form an inner layer of the corrosion resistant coating 64 adjacent to metal substrate 40 that comprises an amorphous, glassy matrix of binder to which the particulates in the particulate component are embedded in, encapsulated in, enclosed by, or otherwise adhered to. This curing is typically accomplished by heating to a temperature of at least about 250° F. (121° C.), more typically at least about 500° F. (260° C.) to form the inner layer 64 of corrosion resistant coating. If any liquid carrier component is present in the first deposited coating, the liquid carrier component is evaporated and/or vaporized during the step of curing 220.

The next step 225 is depositing an additional layer of corrosion resistant coating composition of this invention or from other coating compositions. At least the inner layer 64 adjacent to metal substrate 40 is formed from the corrosion resistant coating composition of this invention. As described above, the corrosion resistant coating composition or other coating compound can be deposited in solid form, e.g., as a flowable solid, as a cast tape (e.g., a cast tape formed as a layer or plurality layers of particulates adhered together as a coherent mass or matrix by the binder, with or without a supporting structure such as a film, strip, etc.), etc., to provide a solid uncured layer of the composition comprising the particulates and binder component.

The next step 230 is curing the additionally deposited coating composition at a temperature that causes the additionally deposited composition to form an inner layer of the corrosion resistant coating 62 adjacent to metal substrate 40. This curing is typically accomplished by heating to a temperature of at least about 250° F. (121° C.), more typically at least about 500° F. (260° C.) to form an additional layer 68 of corrosion resistant coating. If any liquid carrier component is present in the additionally deposited coating, the liquid carrier component is evaporated and/or vaporized during the step of curing 230. Alternately, steps 225 and 230 may be repeated a preselected number of times, with the corrosion resistant particulate component or other being applied a preselected number of times until the total coating thickness is a preselected thickness.

Figure 6:
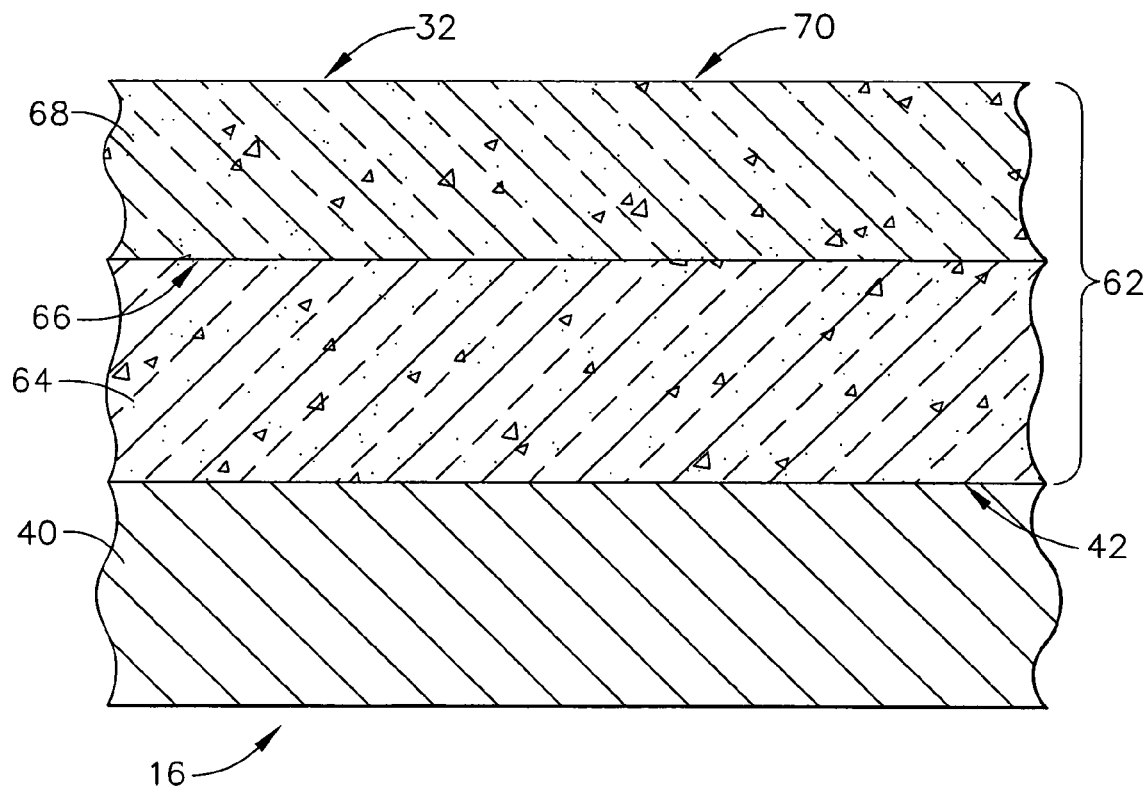
FIG. 6 is a schematic view similar to FIG. 4 of a multiple-layer corrosion resistant coating of the present invention deposited on the under platform substrate of the turbine blade.

As shown in FIG. 6, with one exemplary additional layer, when no sealant layer is added to the surface 70 of the uppermost layer 68, the surface 70 of the uppermost layer is the surface 32 of the under platform corrosion resistant coating, shown generally as 62. The respective layers of coating 62 can have the same or differing thicknesses. These layers typically tend to decrease in thickness in the direction from the inner layers (i.e., those closer to substrate 40) to the outer layers (i.e., those layers further away from substrate 40). The coating composition used in forming each of the respective layers can have the same or differing levels of particulate component and glass-forming binder component, as well as the same or differing types of particulates in the particulate component.

The coating composition used in forming each of the respective layers can also have the same or a differing binder component, for example, magnesium phosphate in the inner layers and aluminum phosphate in the outer layers. In addition, the level of alumina particulates in the particulate component of the coating composition can differ in the respective layers, and typically increases from the inner layers to the outer layers. For example, the inner layer or layers adjacent to the metal substrate can be formed from the corrosion resistant coating compositions of this invention comprising a level or amount of non-alumina particulates (e.g., at least about 5%, typically at least about 25%, more typically at least about 50% and potentially 100%) having a better CTE match with the metal substrate, while the outer layer or layers not adjacent to the metal substrate can comprise a level or amount of alumina particulates (e.g., up to and including 100% alumina particulates) so as not to be measurably different from the CTE of alumina. Each layer of coating 62 deposited can be cured to the same or different degrees.

Figure 7:
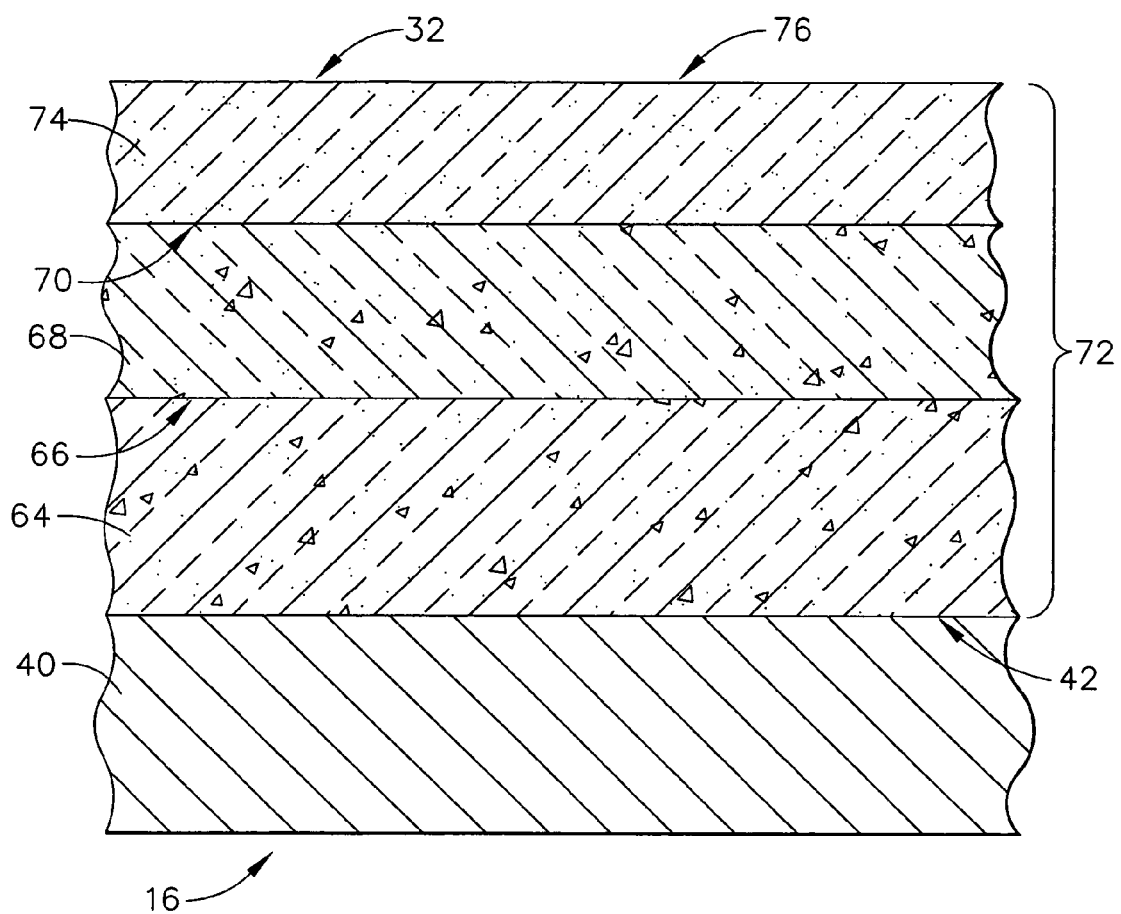
FIG. 7 is a schematic view similar to FIG. 4 of another multiple-layer corrosion resistant coating of the present invention deposited on the under platform substrate of the turbine blade with an additional outer layer.

The next optional step 235 is applying a layer of sealant material to the surface of the cured corrosion resistant layer 54. An embodiment of a corrosion resistant coating of this invention comprising a plurality of coating layers 64, 66 and an outer sealant layer 74 is shown in FIG. 7 generally as 72. This outer sealant layer 74 can comprise a particulate component, but is typically substantially free of particulates. Typically, outer layer 74 is formed from a sealant composition or a composition that consists essentially of, or entirely of, a glass-forming binder component (i.e., is substantially free of particulates) to form a glassy outer sealant layer. The next step 230 is curing the sealant layer 56. This curing is typically accomplished by heating to a temperature of at least about 250° F. (121° C.), more typically at least about 500° F. (260° C.) to form corrosion resistant coating 52. If any liquid carrier component is present in the layer of sealant material, the liquid carrier component is evaporated and/or vaporized during the step of curing 230. Outer layer 56 is also typically thinner than the underlying layer 52, especially when substantially free of particulates. If desired, an outer glassy sealant layer can be formed for coating 72 by depositing and curing a composition that is similar to or consists essentially of a glass-forming binder component that is substantially free of the particulate component, e.g., a sealant composition. Such outer glassy sealant layers can be formed from commercially available sealant products, for example, Alseal 598 (from Coatings for Industry, Inc. of Souderton, Pa.), SermaSeal TCS (from Sermatech International of Pottstown, Pa.), etc.

As shown in FIG. 7, coating 72 comprises a first inner layer 64 that is adjacent to and overlaying metal substrate 60, and is formed from a corrosion resistant coating composition of this invention. In the embodiment shown, inner layer 64 is relatively thick compared to any subsequent layers 68, 74 and preferably has a thickness of from about 0.1 to about 5 mils (from about 3 to about 127 microns), more preferably from about 0.2 to about 4 mils (from about 5 to about 102 microns). The particulate component comprising inner layer 168 also typically has a greater level or amount of non-alumina particulates, relative to the amount or level of alumina particulates, to provide a better CTE match with substrate 60. The particulate component in inner layer 168 comprises from 0 to about 95% alumina particulates and from about 5 to 100% non-alumina particulates, typically from 0 to about 75% alumina particulates and from about 25 to 100% non-alumina particulates, more typically from 0 to about 50% alumina particulates and from about 50 to 100% non-alumina particulates, and can potentially consist essentially of, or entirely of (i.e., is 100%), non-alumina particulates.

Coating 72 also comprises an additional layer indicated generally as 68 adjacent to and overlaying the surface 66 of inner layer 64. Additional layer 68 is typically relatively thinner, especially relative to inner layer 64. Additional layer 68 typically has thickness of from about 0.01 to about 5 mils (from about 0.3 to about 127 microns), more typically from about 0.1 to about 3 mils (from about 3 to about 76 microns). The particulate component of additional layer 68 can also comprise an increased amount or level of alumina particulates than that present in inner layer 64 because there is less of a need for a CTE match with inner layer 64. For example, additional layer 68 can potentially have a CTE that is not measurably different from that of alumina. Typically, the particulate component in additional layer 68 can comprise from 0 to about 100% alumina particulates and from 0 to 100% non-alumina particulates, and can potentially consist essentially of, or entirely of (i.e., is 100%), alumina particulates.

As shown in FIG. 7, coating 72 can further comprise an outer sealant layer indicated generally as 74 adjacent to and overlaying the surface 70 of additional layer 68. This sealant layer 74 can comprise a particulate component, but is typically substantially free of particulates. Typically, sealant layer 74 is formed from a sealant composition or a composition that consists essentially of, or entirely of, a glass-forming binder component (i.e., is substantially free of particulates) to form a glassy outer sealant layer. Outer sealant layer 74 is also typically the thinnest layer of coating 164, especially when substantially free of particulates. Typically, outer sealant layer 74 has a thickness of from about 0.01 to about 2 mils (from about 0.3 to about 51 microns), more typically from about 0.1 to about 1 mils (from about 3 to about 25 microns). The final step 245 is removing the maskant as known in the art.

The corrosion resistant coatings of this invention can also be applied during original manufacture of the gas turbine engine blade (i.e., an OEM turbine blade), after the turbine blade has been in operation for a period of time, after other coatings have been removed from the turbine blade (e.g., a repair situation), etc.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for coating a section selected from the group consisting of the under platform section, the dovetail section, and combinations thereof of a gas turbine engine blade the method comprising the steps of:

providing a gas turbine blade comprising a superalloy selected form the group consisting of nickel-base superalloys, cobalt-base superalloys, iron-base superalloys, and combinations thereof, the blade further comprising:
    an airfoil section having at least an exterior surface;
    a platform section having an exterior surface;
    an under platform section having an exterior surface; and
    a dovetail section having an exterior surface;

masking a preselected portion of the gas turbine blade leaving the exterior surface of a non-masked section selected from the group consisting of the under platform section, the dovetail section, and combinations thereof, unmasked, applying a layer of corrosion resistant coating composition, the composition comprising a glass-forming binder and corrosion resistant particulates to the exterior surface of the non-masked section, the particulates comprising:

from about 5 weight percent to about 100 weight percent non-alumina corrosion resistant particulates having a CTE greater than that of the alumina particulates; and balance alumina particulates;

curing the layer of corrosion resistant coating composition forming a corrosion resistant coating layer; and removing the maskant;

wherein the corrosion resistant coating composition further comprises a liquid carrier component and wherein the liquid carrier component is removed from the corrosion resistant coating composition during the step of curing.

2. The method of claim 1, wherein the corrosion resistant particulates comprise from about 50 weight percent to about 100 weight percent non-alumina corrosion resistant particulates and balance alumina particulates.

3. The method of claim 1, wherein the non-alumina corrosion resistant particulates comprise an overlay metal alloy having the formula selected from the group consisting of MCr, MAl, MCrAl, MCrAlX, MCrX, MAiX, and combinations thereof, wherein M is selected from the group consisting of iron, cobalt, nickel, and combinations thereof, and wherein X is selected from the group consisting of hafnium, zirconium, yttrium, tantalum, platinum, palladium, rhenium, silicon, and combination thereof.

4. The method of claim 3, wherein the overlay metal alloy comprises a MCrAlY alloy, wherein M is selected from the group consisting of nickel, cobalt, and nickel-cobalt alloy.

5. The method of claim 1, wherein the non-alumina corrosion resistant particulates comprise a ceramic selected from the group consisting of zirconia, zirconia stabilized with yttria, zirconia stabilized with a rare earth oxide, and combinations thereof.

6. The method of claim 1, wherein the non-alumina corrosion resistant particulates comprise yttria-stabilized zirconia.

7. The method of claim 1, wherein the glass-forming binder comprises a phosphate-containing binder component.

8. The method of claim 7, wherein the phosphate-containing binder component comprises a phosphate selected from the group consisting of aluminum phosphate, magnesium phosphate, chromium phosphate, and combinations thereof.

9. The method of claim 7, wherein the phosphate-containing binder component is substantially free of other binder materials.

10. The method of claim 1, wherein the liquid carrier component comprises water.

11. The method of claim 1, further comprising the step of applying a sealant material to a surface of the corrosion resistant coating layer, and curing the sealant material, to form a sealant layer substantially free of particulates.

12. The method of claim 1, further comprising the step of applying an additional corrosion resistant coating composition layer to a surface of the corrosion resistant coating layer, wherein the additional corrosion resistant coating composition has a level of alumina particulates greater than that of the corrosion resistant coating composition and curing the additional coating resistant material composition to form an additional corrosion resistant composition layer.

13. The method of claim 12, further comprising the step of applying a sealant material to a surface of the additional corrosion resistant coating layer, and curing the sealant material, to form a sealant layer substantially free of particulates.

* * * * *